United States Patent [19]

Martin et al.

[11] 4,365,539
[45] Dec. 28, 1982

[54] FLUID PRESSURE ACTUATOR WITH STROKE END LOCK MECHANISM

[75] Inventors: Eugene J. Martin, Portage; Thomas Rollins, Kalamazoo, both of Mich.

[73] Assignee: Pneumo Corporation, Boston, Mass.

[21] Appl. No.: 352,044

[22] Filed: Feb. 24, 1982

[51] Int. Cl.³ .............................................. F15B 15/26
[52] U.S. Cl. ....................................................... 92/17
[58] Field of Search ......................... 92/15, 17, 28, 31

[56] References Cited
U.S. PATENT DOCUMENTS 2,774,336  12/1956  Geyer ...................................... 92/17
2,782,766   2/1957  Bodem .................................... 92/17

Primary Examiner—Martin P. Schwadron
Assistant Examiner—Richard Klein
Attorney, Agent, or Firm—Maky, Renner, Otto & Boisselle

[57] ABSTRACT

A fluid pressure actuator includes a lock mechanism for locking the actuator against movement in one end position, and an external lock release lever engageable with an external extension of the lock mechanism for releasing same. The lock release lever is engageable by a lock piston upon application of system pressure thereto to release the lock mechanism. During movement of the lock piston in the unlocking direction, and after disengagement of the lock mechanism, system pressure is ported through the lock piston both to the extend side of the actuator and the opposite end of the lock piston. By using substantially the same size seals on the opposite pressurized side of the lock piston and external extension of the lock mechanism, any effect of fluid pressure acting on such external extension of the lock mechanism is substantially negated. Accordingly, the effective area of the lock piston acted upon by system pressure to release the lock mechanism will remain substantially constant both before and after system pressure is admitted to the extend side of the actuator, whereby the lock is effectively locked open and there is always substantially full flow to the extend side of the actuator despite fluctuations in the extend pressure.

10 Claims, 2 Drawing Figures

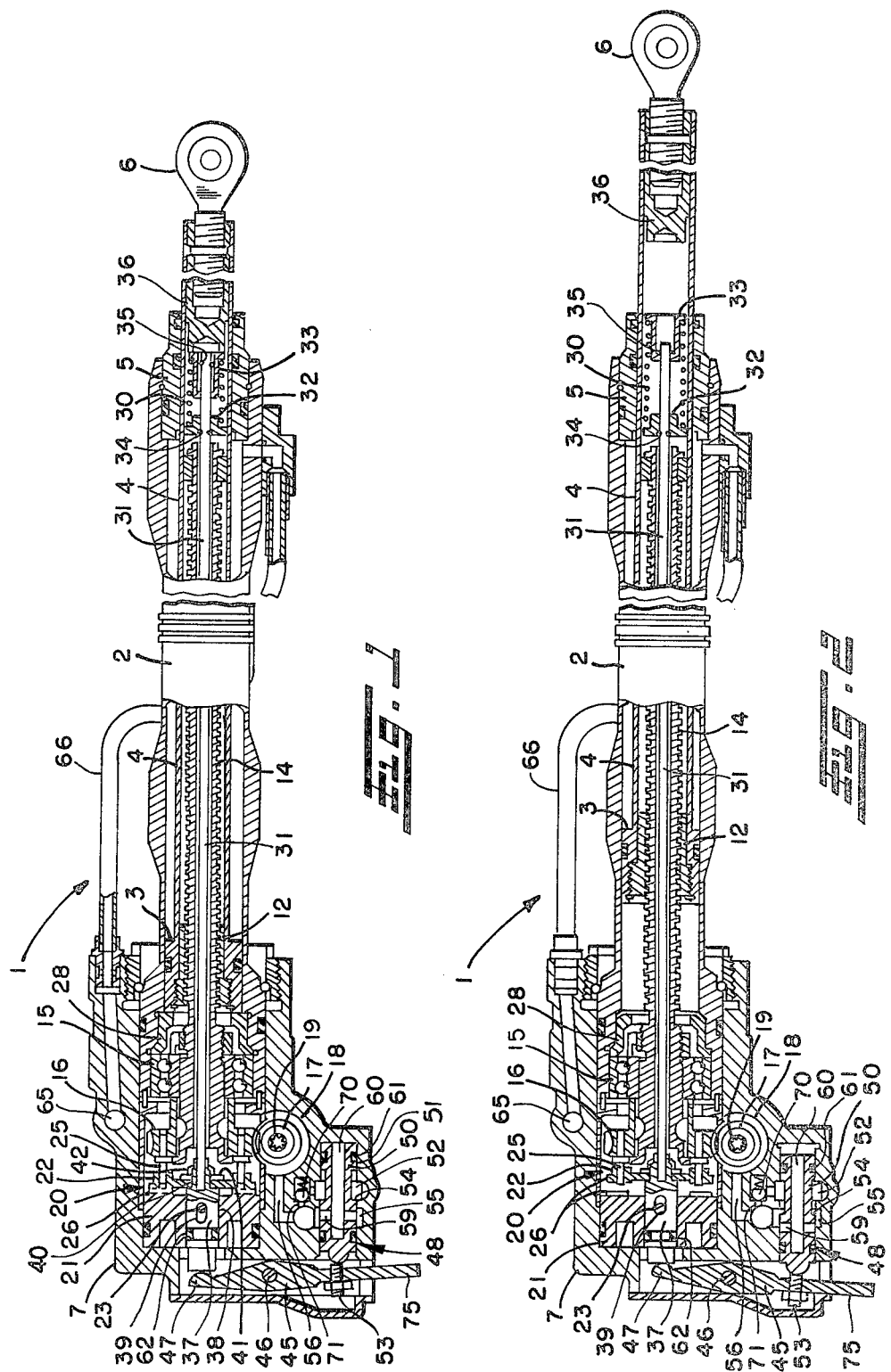

FLUID PRESSURE ACTUATOR WITH STROKE END LOCK MECHANISM

BACKGROUND OF THE INVENTION

This invention relates generally as indicated to a fluid pressure actuator with stroke end lock mechanism, and more particularly, to such an actuator including a novel lock release mechanism for applying a substantially constant force to release the lock mechanism both before and after fluid pressure is applied to the actuator.

In certain actuator installations requiring a lock mechanism for locking the actuator against movement in one position, it is desirable to provide a lock release lever external to the actuator and isolate the lock release lever from the internal fluid pressure used to operate the actuator. The lock release lever may be powered by a lock piston which also admits fluid pressure to the actuator after the lock mechanism has been released to cause the actuator to move in the desired direction. However, this may have the objection that a larger differential area may be required on the lock piston to release the lock than would otherwise be required because of the fluid pressure in the actuator acting on the lock mechanism in opposition to the lock release force. Also, fluctuations in such fluid pressure could cause the lock piston to throttle back and thereby cause an undesirable reduction in the flow of fluid to the actuator during operation thereof.

SUMMARY OF THE INVENTION

With the foregoing in mind, it is a principal object of this invention to provide a fluid actuator in which a substantially constant effective force may be applied to release the lock mechanism both before and after fluid pressure is applied to the actuator.

Another object is to provide such an actuator in which the extend pressure acting on the lock mechanism in opposition to the unlocking force is effectively negated.

Still another object is to provide such an actuator in which substantially full flow to the actuator may be maintained during operation thereof despite fluctuations in such fluid pressure.

These and other objects of the present invention may be achieved by providing the actuator with an internal lock mechanism for locking the actuator against movement in one position, and an external lock release lever engageable with an external extension of the lock mechanism for releasing same. The lock release lever is engageable by a lock piston contained within a bore in the actuator housing upon application of system pressure thereto to release the lock mechanism. During movement of the lock piston in the unlocking direction, system pressure is simultaneously applied both to the extend side of the actuator and the opposite end of the lock piston. By using the same size seals on the pressurized sides of the lock piston and external extension of the lock mechanism, any effect of fluid pressure acting on the lock mechanism is substantially negated. Accordingly, the effective area of the lock piston acted upon by fluid pressure to release the lock mechanism will remain substantially constant both before and after extend pressure is admitted to the actuator, whereby the lock mechanism is effectively locked open and there is always substantially full flow to the extend side of the actuator despite fluctuations in the extend pressure.

BRIEF DESCRIPTION OF THE DRAWINGS

In the annexed drawings:

FIG. 1 is a fragmentary longitudinal section through a preferred form of actuator in accordance with the present invention, showing the actuator in the fully stowed and locked position; and FIG. 2 is a fragmentary longitudinal section through the actuator similar to FIG. 1 but showing the actuator partially extended.

DETAILED DESCRIPTION OF THE PREFERRED EMBODIMENT

Referring now in detail to the drawings, there is shown a linear actuator 1 which may be of conventional type including a cylinder 2 containing a piston 3. Attached to the piston is a hollow rod 4 which extends through the rod end gland 5 of the cylinder and has a rod end assembly 6 on the outboard end thereof to facilitate connection to the movable or stationary part of the device to be actuated. A suitable mount may also be provided on the actuator housing 7 adjacent the head end of the cylinder or on the cylinder itself for attachment to the other part of the device to be actuated.

In the center of the piston 3 is a high lead Acme nut 12 attached as by threading it into the piston and locking it with a pin. Coupled to the Acme nut is a mating Acme screw shaft 14. One end of the screw shaft 14 is journaled in suitable bearings 15 within the head end of the cylinder, whereas the other end extends into the hollow piston rod 4 a substantial distance beyond the nut 12, whereby as the piston 3 moves back and forth in the cylinder 2, the screw shaft 14 rotates at a speed proportional to the velocity of the piston. Mounted on the screw shaft 14 is a high lead worm wheel 16 which mates with a worm shaft 17 also bearing mounted in a transverse bore 18 in the head end of the actuator. The ends of the worm shaft may be provided with double square holes 19 or the like to facilitate attachment of a synchronous drive shaft or rod thereto. Since the speed of the worm shaft 17 is also proportional to the velocity of the piston rod 4, when the worm shafts of two or more such actuators are thus connected together, they will be mechanically synchronized in both position and motion, as well known in the art.

When the actuator 1 is in the retracted or stowed position shown in FIG. 1, the actuator may be locked in such position by a lock mechanism 20 as described hereafter. Such lock mechanism desirably consists of a stationary lock plate 21 fixedly secured within the actuator housing 7 and a movable lock plate 22 mounted for limited axial movement toward and away from the stationary lock plate. The stationary lock plate 21 is pinned to the housing as by a rod 23 extending from the housing 7 transversely through the plate 21. The movable lock plate 22 may be attached to the worm gear 16 by axially extending pins 25 which cause the movable lock plate to rotate with the worm gear while permitting limited relative axial movement therebetween.

The opposed faces of the stationary and movable lock plates 21, 22 have cooperating lock teeth 26 thereon which are shaped in such a manner that when engaged they permit ratcheting of the movable lock plate relative to the stationary lock plate during retraction of the piston but not during extension thereof. Accordingly, the piston 3 will continue to retract until it engages a retractor stop 28 within the actuator housing adjacent the head end of the cylinder. However, the piston cannot be extended as long as the lock plates are in engagement with each other, since the lock plates lock the worm gear 16 and screw shaft 14 which drives same against rotation in a direction corresponding to that generated by extending the piston.

When the actuator is retracted as shown in FIG. 1, the movable lock plate 22 is normally maintained in engagement with the stationary lock plate 21 by a spring 30 which may be mounted within the cylinder adjacent the outer end of the screw shaft 14. The spring force is transmitted to the movable lock plate 22 by a lock rod 31 which extends through the center of the screw shaft and has a pair of axially spaced apart spring seats 32, 33 mounted on the outer end thereof for retaining the spring 30 therebetween. Retaining wires 34, 35 or the like on the lock rod 31 limit the maximum separation between the spring seats. Such maximum separation will occur during extension of the actuator as shown in FIG. 2, after which the spring 30 will no longer be effective in transmitting a locking force to the lock mechanism 20 as described hereafter. However, during retraction of the actuator, as the piston 3 approaches the end of its stroke, a rod end insert 36 within the outer end of the piston rod 4 engages the outer spring seat 33 urging it toward the inner spring seat 32, thus compressing the spring 30 sufficiently to cause the lock rod 31 to move axially inwardly toward the movable lock plate 22.

The inner end of the lock rod 31 is attached to a lock release pin 37 axially slidable within a central bore 38 within the stationary lock plate 21. The rod 23 which is used to lock the plate 21 against movement extends through an elongated slot 39 in the lock release pin so as not to obstruct its axial movement. The lock release pin 37 has a reduced diameter portion 40 on the inner end thereof on which the movable lock plate 22 is rotatably mounted and retained in place as by means of a lock plate washer 41 held on the reduced diameter portion by a swage ring 42. Accordingly, such axial inward movement of the lock rod 31 will be transmitted to the movable lock plate 22 through the lock release pin 37.

With the actuator 1 in the stowed and locked position illustrated in FIG. 1, before the actuator can be extended, the lock 22 must be released. To release the lock, a lock release lever 45 is provided adjacent the outer end of the lock release pin 37. The lock release lever 45 may be mounted on a shaft 46 on the exterior of the actuator housing 7 to isolate the lock release lever from the internal hydraulic fluid used to actuate the actuator. The inner end 47 of the lock release lever 45 engages the outer end of the lock release pin 37. Movement of the lock release lever is controlled by fluid pressure actuation of a locking sequence power valve 48 as described hereafter. Such valve includes a lock piston 50 contained within a bore 51 in the actuator housing. The bore 51 has a lock-in annulus 52 which when pressurized urges the lock piston 50 into engagement with the outer end of the lock release lever 45 causing the same to pivot about the shaft 46 and move the lock release pin 37 axially inwardly against the force of the spring 30 to disengage the movable lock plate 22 from the stationary lock plate 21. An adjustment screw 53 may be provided on the lock release lever for transmitting the force from the lock piston to the lock release lever. Such an adjustment screw 53 may be used to minimize free play and provide for adjustment of the extreme end positions of movement of the lock release lever by the lock piston.

Before the lock piston 50 can move the lock release lever in a direction to release the lock, the pressure acting on the differential area 54 of the lock piston must be sufficient to overcome the preload of the spring 30. After the lock piston has moved far enough to cause the lock teeth on the movable lock plate 22 to disengage from the lock teeth on the stationary lock plate 21, the system pressure acting on the lock piston may also be ported to the extend side of the actuator through another annulus 55 in the lock piston bore 51 which is uncovered by the lock piston following such movement as shown in FIG. 2. The annulus 55 communicates with the head end of the cylinder through a passage 56 in the cylinder housing 7.

The extend pressure admitted to the head end of the cylinder will also act on the lock release pin 37 in opposition to the lock release force applied thereto by the lock piston 50. However, at the same time that fluid pressure is admitted to the head end of the cylinder, such fluid pressure is also ported to the opposite end of the lock piston 50 through the same annular port 55 that receives fluid pressure from the lock-in annulus 52 when the lock piston has moved to the unlocking position shown in FIG. 2 through radial and longitudinal passages 59, 60 in the lock piston in communication therewith. By using the same size seals 61, 62 on the pressurized sides of the lock piston 50 and lock release pin 37, any effect of hydraulic pressure acting on the lock release pin will be substantially completely negated. Accordingly, the effective area 54 of the lock piston 50 acted upon by fluid pressure to release the lock mechanism will remain substantially constant at all times, that is, both before and after extend pressure is admitted to the head end of the actuator. This is particularly important when the lock valve 48 is also used to power the actuator as in the present invention, in that the valve will always remain open and allow substantially full flow to the extend side of the actuator as long as system pressure is applied to the lock-in port. Such balancing of the pressures acting on the lock release pin also eliminates any throttling effect or pulsations on the valve caused by fluctuations in the extend pressure.

If the extend pressure acting on the lock release pin 37 was not substantially balanced in the manner previously described, the differential area 54 on the lock piston 50 would have to be much larger to insure that the lock remains open after system pressure is applied to the extend side of the cylinder and the lock piston does not throttle back and cut down on the flow to such extend side. Not only would such a larger differential pressure area be undesirable from a packaging standpoint, but it would also require the use of a larger spring force to reengage the lock when the piston has been returned to its fully retracted and stowed position.

Before fluid pressure is admitted to the lock-in annulus 52 for effecting release of the lock, system pressure is also desirably applied to the retract end of the cylinder through the retract port 65 and porting tube 66 to remove any axial tension loads on the actuator which might otherwise interfere with release of the lock. Then, with the system pressure still applied to the retract port, system pressure is also applied to the lock-in annulus 52, first to release the lock, and then to apply extend pressure to the head end of the actuator in the manner previously described. Since the area of the piston 3 exposed to the extend pressure is greater than that exposed to the retract pressure, the actuator will extend. As it does so, the outer spring seat 33 will move away from the inner spring seat 32 until it engages the retaining wire 35 as shown in FIG. 2, at which point there is no longer any spring loading of the lock mechanism.

To retract the actuator, the pressure acting on the extend side of the piston 3 is reduced, as by connecting the lock-in annulus 52 to return pressure, while still maintaining system pressure on the retract side of the piston. During retraction of the piston, the movable lock plate 22 is maintained out of engagement with the stationary lock plate 21 by the return pressure acting on the lock piston 50 until the rod end insert 36 contacts the spring seat 33 and compresses the spring 30 sufficiently to overcome the force exerted by the lock piston and push the movable lock plate into engagement with the stationary lock plate. This normally occurs within the last 3/10 inch or so of the retract stroke. However, the actuator will continue to move in the stow direction until the actuator piston 3 engages the internal stop 28 because of the torque developed by the screw shaft 14 which causes the lock teeth on the movable lock plate 22 to ratchet over the teeth on the stationary lock plate. When the actuator piston engages the retract stop, the screw shaft 14 also stops, and since the lock teeth 26 on the stationary and movable lock plates 21, 22 are already in engagement with each other, any motion that tends to extend the actuator will cause the locking faces of the lock teeth to engage thus providing a positive lock against such motion.

As the lock piston returns to its fully retracted position shown in FIG. 1, fluid communication between the lock-in annulus 52 and extend side of the piston is blocked through the lock piston. However, return flow from the extend side of the piston still occurs through a check valve 70 in another passage 71 in the actuator housing 7 providing communication between the extend side and port 52.

Manual release of the lock may be accomplished as providing an extension handle 75 on the lock release lever 45 extending outwardly beyond the actuator housing. To disengage the lock manually, the only action required is to push or pull the extension handle 75 in a direction causing the inner end of the lock release lever to engage the outer end of the lock release pin 37 and unseat the movable lock plate 22 from the stationary lock plate 21. After manual release of the lock, the actuator can be extended mechanically by rotating the worm shaft 17 using a suitable mechanical drive mechanism connected thereto.

From the foregoing, it will now be seen that the lock release mechanism of the present invention provides a very effective and simple means for applying a substantially constant effective force to release the lock mechanism both before and after fluid pressure is applied to the actuator. Due to the design of the lock release mechanism, the effect of the fluid pressure acting in opposition to the unlocking force is substantially effectively negated, whereby the lock mechanism is effectively locked open and substantially full flow may be provided to the actuator despite any fluctuations in such fluid pressure.

Although the invention has been shown and described with respect to a certain preferred embodiment, it is obvious that equivalent alterations and modifications will occur to others skilled in the art upon the reading and understanding of the specification. The present invention includes all such equivalent alterations and modifications and is limited only by the scope of the claims.

The embodiments of the invention in which an exclusive property or privilege is claimed are defined as follows:

1. A fluid actuator comprising a cylinder, a piston axially movable within said cylinder, a member rotatably journaled in said cylinder and operatively connected to said piston such that axial movement of said piston effects and is dependent on rotation of said member, releasable lock means engageable with said member for preventing rotation of said member thereby locking said piston against movement, a fluid pressure operated lock piston movable in a direction to release said lock means, said lock means having a first surface area exposed to the fluid pressure that is applied to said actuator to move said piston after said lock means has been released creating a force tending to move said lock piston in the opposite direction, and said lock piston having a second surface area which is exposed to the same fluid pressure that is applied to the actuator creating a force acting in opposition to the force exerted on said lock means by fluid pressure acting in said first surface area.

2. The actuator of claim 1 wherein said first and second surface areas are substantially the same size, whereby the force exerted on said lock means by the fluid pressure acting on said first surface area is substantially negated by the force exerted on said lock means by the fluid pressure acting on said second surface area.

3. The actuator of claim 2 wherein the same size fluid seals are used to isolate the fluid pressure acting on said first and second surface areas.

4. The actuator of claim 1 wherein said lock piston includes a differential area which is acted upon by fluid pressure to move said lock piston in a direction to release said lock means.

5. The actuator of claim 4 wherein said actuator and lock piston include passage means for simultaneously porting such fluid pressure acting on said differential area to said actuator and to said second surface area on said lock piston after said lock piston has moved to a position releasing said lock means.

6. A fluid actuator comprising a cylinder, a piston axially movable within said cylinder, a member rotatably mounted in said cylinder and operatively connected to said piston such that axial movement of said piston will only occur if said member is free to rotate, releasable lock means engageable with said member for preventing rotation of said member, means for applying a releasing force to said lock means to release same, said lock means having a surface area that is acted upon by the fluid pressure applied to the actuator to move said piston after said lock means has been released creating a force opposing such releasing force, and means for applying a second force to said lock means of substantially the same magnitude as the opposing force to negate its effect on said lock means.

7. The actuator of claim 6 wherein said means for applying a releasing force to said lock means to release same comprises a lock piston having a differential area which is acted upon by fluid pressure to move said lock piston in a direction to release said lock means, said means for applying a second force to said lock means comprising another surface area on said lock piston of substantially the same size as the surface area of said lock means acted upon by such fluid pressure, and means for porting such fluid pressure applied to the actuator to move said piston after said lock means has been released to act on said another surface area for creating said second force.

8. The actuator of claim 7 further comprising passage means in said actuator and lock piston for simultaneously porting such fluid pressure to the actuator and said another surface area on said lock piston after said lock means has been released.

9. The actuator of claim 7 wherein said lock means comprises a stationary lock plate and a movable lock plate, said movable lock plate being connected to said member for rotation therewith and being axially movable into and out of locking engagement with said stationary lock plate, said movable lock plate having a lock release pin extending therefrom, and a pivotally mounted lock release lever for transmitting movement of said lock piston to said lock release pin to disengage said movable lock plate from said stationary lock plate, said lock release pin including said surface area acted upon by the fluid pressure applied to the actuator to move the piston after said lock means has been released.

10. The actuator of claim 7 further comprising means for engaging said lock means at one stroke end of said piston for preventing rotation of said member in a direction corresponding to movement of said piston in the opposite direction to lock said piston against movement in such opposite direction until released by such releasing force.

* * * * *